(12) United States Patent
Ishii

(10) Patent No.: US 12,063,331 B2
(45) Date of Patent: Aug. 13, 2024

(54) IMAGE PROCESSING APPARATUS, IMAGE PROCESSING METHOD, AND RECORDING MEDIUM

(71) Applicant: CANON KABUSHIKI KAISHA, Tokyo (JP)

(72) Inventor: Masatoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 17/545,603

(22) Filed: Dec. 8, 2021

(65) Prior Publication Data
US 2022/0191339 A1 Jun. 16, 2022

(30) Foreign Application Priority Data
Dec. 15, 2020 (JP) ................. 2020-207881

(51) Int. Cl.
H04N 1/04 (2006.01)
G06T 7/00 (2017.01)
H04N 1/00 (2006.01)

(52) U.S. Cl.
CPC ......... H04N 1/00702 (2013.01); G06T 7/001 (2013.01); H04N 1/0071 (2013.01); H04N 1/00721 (2013.01)

(58) Field of Classification Search
None
See application file for complete search history.

(56) References Cited

U.S. PATENT DOCUMENTS

2022/0191339 A1* 6/2022 Ishii ................... H04N 1/00702

FOREIGN PATENT DOCUMENTS

JP 2004310726 A 11/2004

* cited by examiner

Primary Examiner — Cheukfan Lee
(74) Attorney, Agent, or Firm — Canon U.S.A., Inc. IP Division

(57) ABSTRACT

In an image processing apparatus, a condition for detecting a print position deviation on a print medium in a printed material is set. Based on the condition, data obtained by reading the print medium for the print position deviation is inspected. In the condition, in a case where a width of the print medium is larger than a readable width for reading the print medium, a settable range is small relative to a case where the width of the print medium is smaller than the readable width.

10 Claims, 19 Drawing Sheets

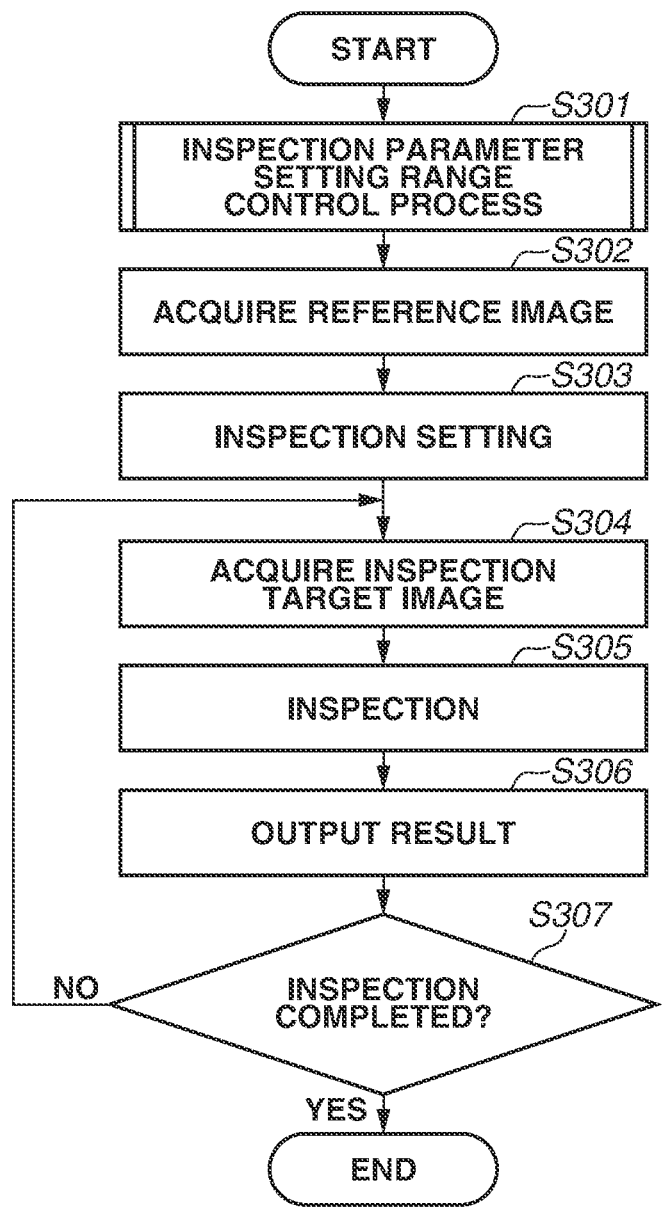

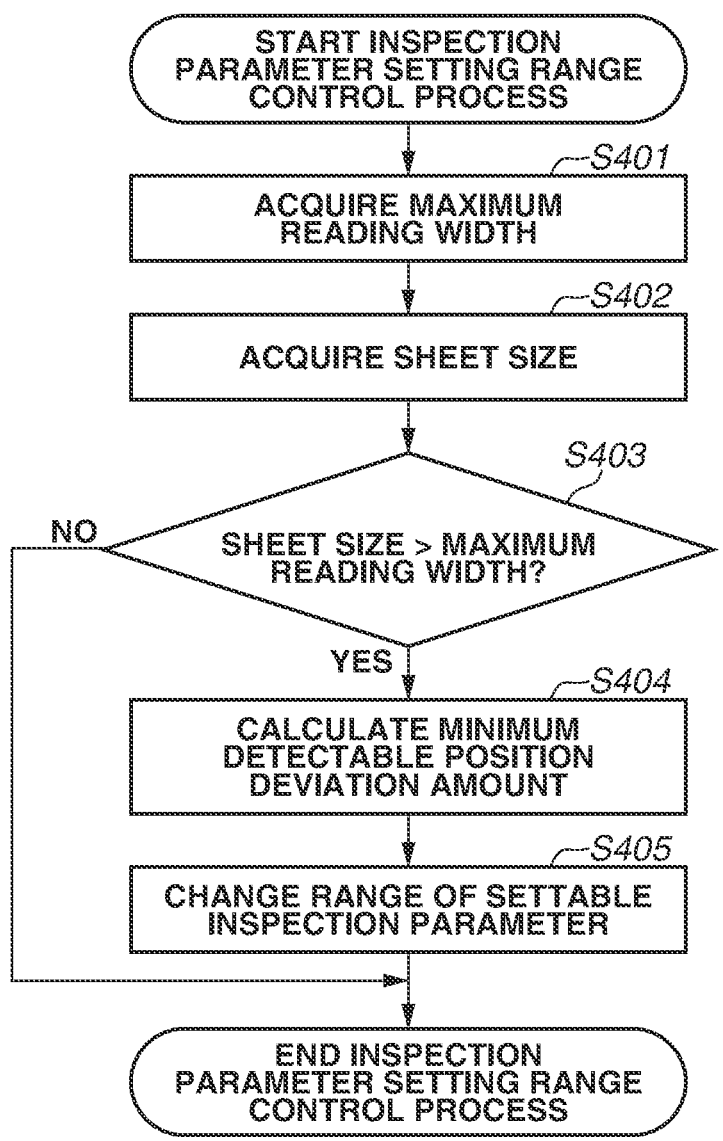

FIG.6A

| INSPECTION SETTING | | |
|---|---|---|
| PRINT POSITION DEVIATION | 1.0 ▽ | mm |
| | 1.0 | |
| | 2.0 | ~601 |
| | 3.0 | |
| | 4.0 | |
| | 5.0 | |

FIG.6B

| INSPECTION SETTING | | |
|---|---|---|
| PRINT POSITION DEVIATION | 3.0 ▽ | mm |
| | 3.0 | |
| | 4.0 | ~602 |
| | 5.0 | |
| | 6.0 | |
| | 7.0 | |

FIG.7

| INSPECTION SETTING | |
|---|---|
| PRINT POSITION DEVIATION | LEVEL 1 ▽ |
| | LEVEL 1 |
| | LEVEL 2 ~701 |
| | LEVEL 3 |
| | LEVEL 4 |
| | LEVEL 5 |

FIG.8A

LEVEL 1: 1.0 mm
LEVEL 2: 2.0 mm
LEVEL 3: 3.0 mm
LEVEL 4: 4.0 mm
LEVEL 5: 5.0 mm

FIG.8B

LEVEL 1: 3.0 mm
LEVEL 2: 4.0 mm
LEVEL 3: 5.0 mm
LEVEL 4: 6.0 mm
LEVEL 5: 7.0 mm

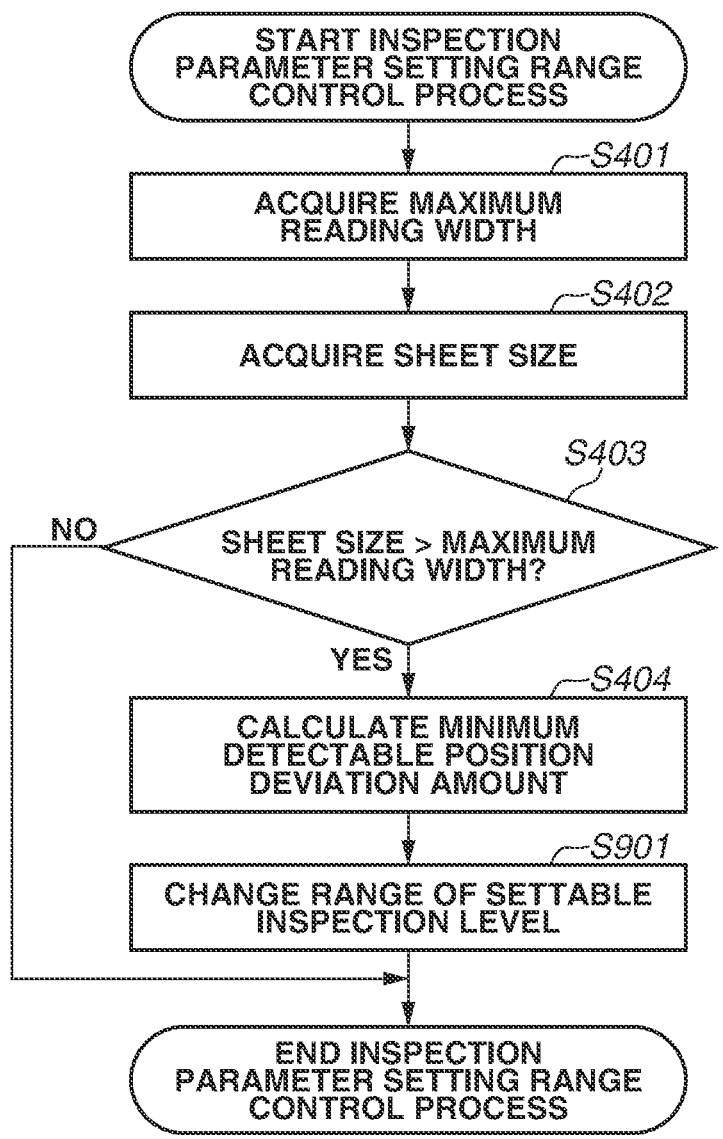

FIG.10A

INSPECTION SETTING

PRINT POSITION DEVIATION — LEVEL 1 ▽

- LEVEL 1
- LEVEL 2
- LEVEL 3
- LEVEL 4
- LEVEL 5

INSPECTION SETTING

PRINT POSITION DEVIATION — LEVEL 3 ▽

- LEVEL 3
- LEVEL 4
- LEVEL 5

LEVEL 1: 1.0 mm
LEVEL 2: 2.0 mm
LEVEL 3: 3.0 mm
LEVEL 4: 4.0 mm
LEVEL 5: 5.0 mm

FIG.18

| INSPECTION SETTING |
|---|

PRINT POSITION DEVIATION (HORIZONTAL)  [ 3.0 ] mm
(3.0 – 10.0)

PRINT POSITION DEVIATION (VERTICAL)  [ 3.0 ] mm
(3.0 – 10.0)

IMAGE PROCESSING APPARATUS, IMAGE PROCESSING METHOD, AND RECORDING MEDIUM

BACKGROUND

Field of the Disclosure

The present disclosure relates to image processing for inspecting a printed material.

Description of the Related Art

In an inspection after outputting a printed material, when an image reading device acquires image data subject to inspection, a part of a sheet of the printed material may exceed a maximum reading width of the image reading device, resulting in generation of an unreadable sheet area. In such a case, an estimation process is performed for the unreadable sheet area. Accordingly, when the image data subject to inspection is compared with good-quality reference image data, an error may occur due to the estimation process and a print defect may be falsely detected.

Japanese Patent Application Laid-Open No. 2004-310726 discusses a method of setting an exceeding portion of the sheet to a non-inspection area to exclude the exceeding portion from an inspection target when performing inspection.

In the method discussed in Japanese Patent Application Laid-Open No. 2004-310726, it is possible to change an inspection setting for the exceeding portion. However, an inspection setting for an entire sheet surface such as a print position deviation remains unchanged, and thus, it is not possible to appropriately inspect the printed material for the print position deviation when the part of the sheet exceeds an imaging area.

SUMMARY

According to embodiments of the present disclosure, an image processing apparatus includes a setting unit configured to set a condition for detecting a print position deviation on a print medium in a printed material, and an inspection unit configured to inspect, based on the condition, data obtained by reading the print medium for the print position deviation, wherein, in the condition, in a case where a width of the print medium is larger than a readable width for reading the print medium, a settable range is small relative to a case where the width of the print medium is smaller than the readable width.

Further features of the present disclosure will become apparent from the following description of exemplary embodiments with reference to the attached drawings.

BRIEF DESCRIPTION OF THE DRAWINGS

FIG. 3 is a flowchart illustrating a flow of an inspection process.

FIG. 4 is a flowchart of an inspection parameter setting range control process according to a first exemplary embodiment.

FIGS. 6A and 6B are diagrams illustrating examples of the inspection setting screen according to the first exemplary embodiment.

FIG. 7 is a diagram illustrating an example of the inspection setting screen according to the first exemplary embodiment.

FIGS. 8A and 8B are diagrams illustrating relationships between inspection levels and print position deviation amounts.

FIG. 9 is a flowchart of an inspection parameter setting range control process according to a second exemplary embodiment.

FIGS. 10A, 10B, and 10C are diagrams illustrating examples of an inspection setting screen according to the second exemplary embodiment.

FIG. 18 is a diagram illustrating an example of an inspection setting screen for setting independently vertically and horizontally parameters corresponding to print position deviations.

DESCRIPTION OF THE EMBODIMENTS

Figure 1:
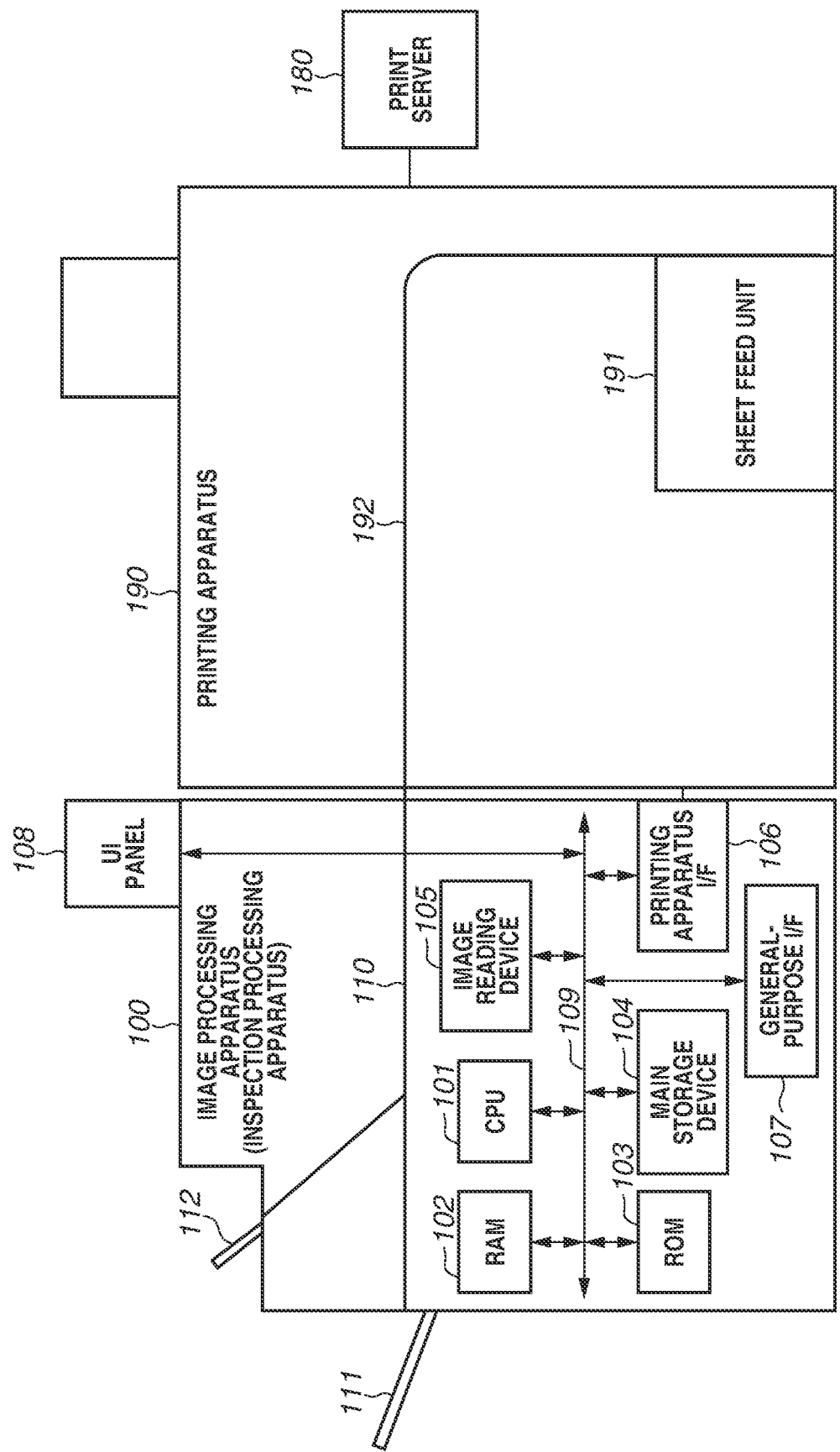
FIG. 1 is a diagram of an overall configuration of a printing system including an image processing apparatus.

Exemplary embodiments of the present disclosure will be described below with reference to the drawings. The following exemplary embodiments do not limit the present disclosure, and not all combinations of the features described in the present exemplary embodiments are necessarily essential to solve the issues of the present disclosure. Identical aspects of the configuration will be described using the same reference numerals, and repeated description will be omitted. Further, each process (step) in the flowcharts is indicated by using a reference numeral starting with S.

In a first exemplary embodiment, a process of appropriately inspecting a printed material for a print position deviation, even in a case where a print medium size (for example, a sheet size) exceeds a maximum reading width of an image reading device, will be described. Specifically, a process of changing a settable range of an inspection parameter in a print position deviation inspection that can be set according to a minimum inspectable position deviation amount will be described.

FIG. 1 illustrates an example of a configuration of an entire printing system for outputting and inspecting a printed material, which includes an image processing apparatus 100 according to the present exemplary embodiment. The printing system according to the present exemplary embodiment includes the image processing apparatus 100, a print server 180, and a printing apparatus 190. In the present exemplary embodiment, the image processing apparatus 100 and the printing apparatus 190 will be described as separate bodies, but the image processing apparatus 100 can be provided in the printing apparatus 190.

The print server 180 has a function of generating a print job of a document to be printed and inputting the print job to the printing apparatus 190.

The printing apparatus 190 forms an image on a print medium (on a print sheet) based on the print job input from the print server 180. An apparatus using an offset printing method, an electrophotographic method, or an inkjet method can be used as the printing apparatus 190. In the present exemplary embodiment, it is assumed that the printing apparatus 190 is a printing apparatus using the electrophotographic method. The printing apparatus 190 includes a sheet feed unit 191, and a user places a print sheet in the sheet feed unit 191 in advance. When a print job is input to the printing apparatus 190, the printing apparatus 190 conveys the print sheet placed in the sheet feed unit 191 along a conveyance path 192, while forming an image on a top surface or on both surfaces of the print sheet, and feeds the print sheet to the image processing apparatus 100.

The image processing apparatus 100 performs an inspection process to check whether a print defect occurs on the sheet, that is, on the printed material formed thereon with an image by the printing apparatus 190 and being fed via the conveyance path 192. That is, the image processing apparatus 100 functions as an inspection processing apparatus. The image processing apparatus 100 includes therein a central processing unit (CPU) 101, a random access memory (RAM) 102, a read only memory (ROM 103), a main storage device 104, an image reading device 105, a printing apparatus interface (I/F) 106, a general-purpose OF 107, a user interface (UI) panel 108, and a main bus 109. The image processing apparatus 100 can include a plurality of processing apparatuses connected to each other via a network, for example. The image processing apparatus 100 further includes a conveyance path 110 for the printed material, which is connected to the conveyance path 192 of the printing apparatus 190, an output tray 111 for an inspection-passed print product, and an output tray 112 for an inspection-failed printed material, in which a print defect has been discovered. Configuration can be that the classification of printed material is not limited to the two types, that is, inspection-passed and inspection-failed, but can be further classified in a more detailed manner.

The CPU 101 is a processor to comprehensively control each unit in the image processing apparatus 100. The RAM 102 functions as a main memory, a work area, or the like of the CPU 101. The ROM 103 stores a group of programs executed by the CPU 101. The main storage device 104 stores an application executed by the CPU 101, data used for image processing, and the like.

The image reading device (scanner) 105 can read one side or both sides of the printed material fed from the printing apparatus 190 on the conveyance path 110 to acquire image data. The printing apparatus I/F 106 is connected to the printing apparatus 190 to synchronize a processing timing of the printed material between the image processing apparatus 100 and the printing apparatus 190 and to communicate mutual operation statuses. The general-purpose I/F 107, which is a serial bus interface based on Universal Serial Bus (USB) or Institute of Electrical and Electronics Engineers (IEEE) 1394, can be used by a user to extract data such as a log and to input data to the image processing apparatus 100.

The UI panel 108 is, for example, a liquid crystal display. The UI panel 108 functions as a user interface of the image processing apparatus 100, and displays a current status and setting to be informed to the user. The UI panel 108 further includes a touch panel or buttons to receive an instruction from the user. The main bus 109 connects respective parts of the image processing apparatus 100. Although not illustrated in FIG. 1, various parts inside the image processing apparatus 100 and the printing system can be operated by an instruction from the CPU 101. For example, the conveyance paths can be synchronized to move the printed material, and switching can be performed so that the printed material is fed either to the output tray 111 for inspection-passed or to the output tray 112 for inspection-failed, according to an inspection result. In addition to the CPU 101, a graphics processing unit (GPU) can be provided.

The image processing apparatus 100 generally performs an inspection process described below based on the image data of the printed material read by the image reading device 105, while conveying the printed material fed from the printing apparatus 190 on the conveyance path 110. As a result of the inspection process, in a case where the printed material passes the inspection, the printed material is conveyed to the output tray 111 for inspection-passed, and otherwise, conveyed to the output tray 112 for inspection-failed. Thus, it is possible to accumulate, as a product to be delivered, only a printed material having checked quality in the output tray 111.

Figure 2:
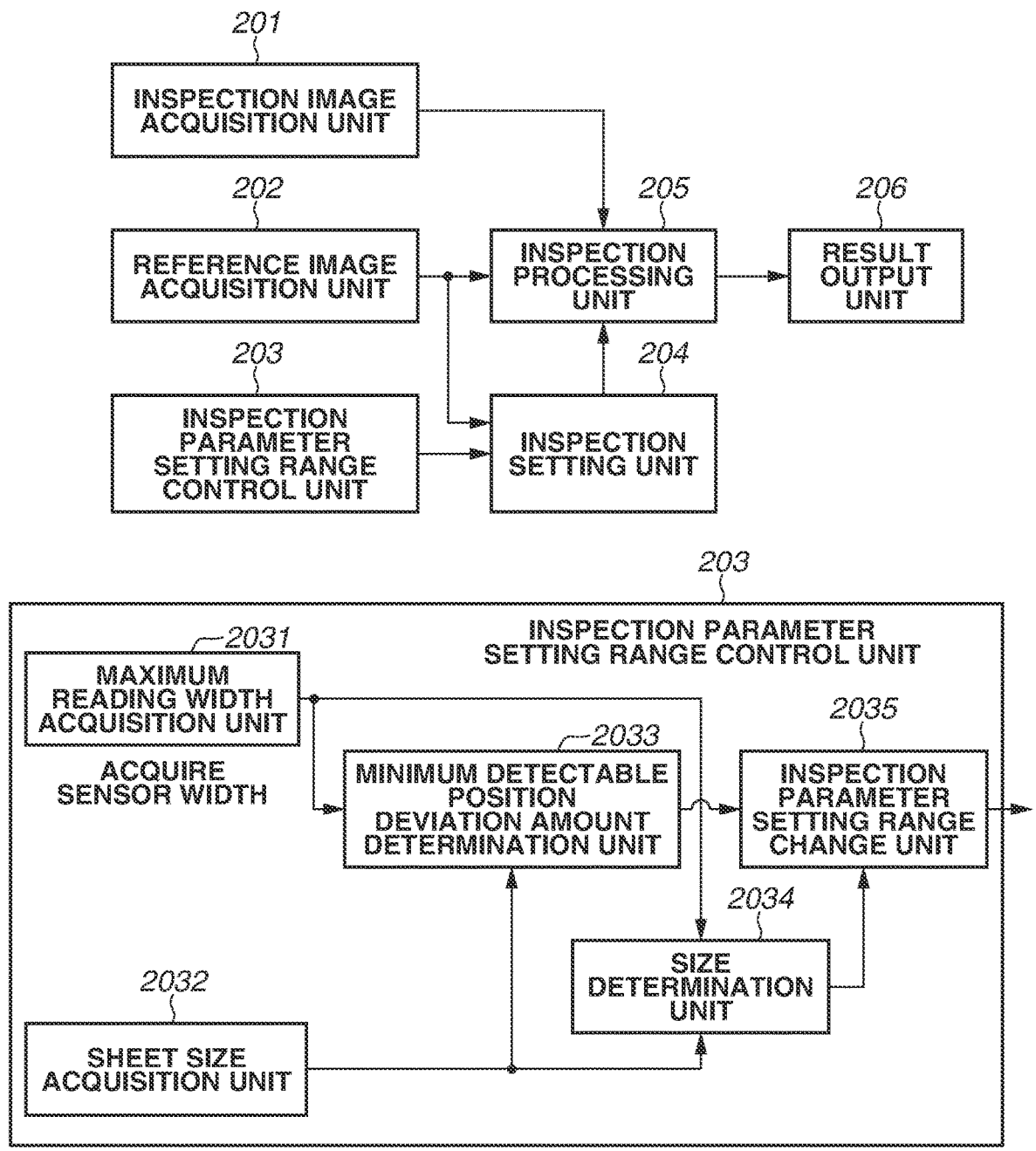
FIG. 2 is a block diagram illustrating a configuration of the image processing apparatus.

Of the above-described system configuration, FIG. 2 illustrates a configuration of each processing block of the image processing apparatus 100 related to the inspection process. The image processing apparatus 100 includes an inspection image acquisition unit 201, a reference image acquisition unit 202, an inspection parameter setting range control unit 203, an inspection setting unit 204, an inspection processing unit 205, and a result output unit 206.

The inspection image acquisition unit 201 uses the image reading device 105 to read the printed material from the printing apparatus 190 on the conveyance path 110 to acquire image data subject to inspection (hereinafter, also referred to as inspection image data or data subject to inspection). The acquired image data is stored in the RAM 102 or the main storage device 104.

The reference image acquisition unit 202 reads reference image data generated in advance from the main storage device 104 into the RAM 102, to acquire the reference image data. Alternatively, the reference image data can be acquired as image data of the printed material on the conveyance path 110 in synchronization with the printed material being output from the printing apparatus 190.

The inspection parameter setting range control unit 203 controls a settable print position deviation inspection parameter based on a maximum reading width of the image reading device 105 and a sheet size of the print sheet, and reflects the settable print position deviation inspection parameter on a display of the UI panel 108. The inspection setting unit 204 performs various types of settings related to the inspection based on an instruction from the user acquired via the UI panel 108. The inspection processing unit 205 compares the inspection image data with the reference image data to perform the inspection. The result output unit 206 displays an inspection result on the UI panel 108, and performs switching so that the printed material is fed either to the output tray 111 for inspection-passed or to the output tray 112 for inspection-failed.

A configuration of the inspection parameter setting range control unit 203 will be described in detail. The inspection parameter setting range control unit 203 includes a maximum reading width acquisition unit 2031, a sheet size acquisition unit 2032, a minimum detectable position deviation amount determination unit 2033, a size determination unit 2034, and an inspection parameter setting range change unit 2035.

The maximum reading width acquisition unit 2031 acquires the maximum reading width of the image reading device 105.

The sheet size acquisition unit 2032 acquires, as a sheet size of the print sheet, a width and a height of the sheet.

Hereinafter, there is a case in which, as the sheet size, only the width of the sheet is used. The minimum detectable position deviation amount determination unit 2033 determines a minimum detectable position deviation amount based on the maximum reading width and the sheet size. The size determination unit 2034 compares the maximum reading width and the sheet size to determine whether the sheet size exceeds the maximum reading width of the image reading device 105. The inspection parameter setting range change unit 2035 changes the settable print position deviation inspection parameter based on the above-described size determination result, and reflects the changed settable print position deviation inspection parameter on the display of the UI panel 108.

FIG. 3 is a flowchart of the inspection process performed by the image processing apparatus 100 according to the present exemplary embodiment.

In step S301, the inspection parameter setting range control unit 203 performs a process of controlling the settable print position deviation inspection parameter based on the maximum reading width of the image reading device 105 and the sheet size of the print sheet. The process will be described in detail below.

In step S302, the reference image acquisition unit 202 acquires reference image data by reading, from the main storage device 104 into the RAM 102, the reference image data generated by reading in advance a printed material having no print defect such as a print position deviation. Alternatively, the reference image data can be acquired as the image data of the printed material on the conveyance path 110 in synchronization with the printed material being output from the printing apparatus 190. However, it is necessary to check that the printed material does not have a print defect such as a print position deviation.

In step S303, the inspection setting unit 204 performs an inspection setting based on an instruction or the like from the user acquired via the UI panel 108. Each setting value is stored in the RAM 102 or the main storage device 104. In the present exemplary embodiment, the print position deviation inspection parameter being a threshold value for detecting a print position deviation is set as the inspection setting. Further, for example, an inspection parameter corresponding to a print defect such as a stain can be additionally set. FIGS. 5A, 5B, 6A, 6B, and 7 illustrate examples of an inspection setting screen on the UI panel 108. In the examples illustrated in FIGS. 5A and 5B, when a user inputs a numerical value in an edit box 501, the print position deviation inspection parameter is set. In the examples illustrated in FIGS. 6A and 6B, the user sets the print position deviation inspection parameter by selecting a desired setting value from a pull-down menu 601 or a pull-down menu 602. In the example illustrated in FIG. 7, the user sets the print position deviation inspection parameter by selecting a desired setting level from a pull-down menu 701. Print position deviation amounts as illustrated in FIGS. 8A and 8B are previously set to each level.

Figure 11:
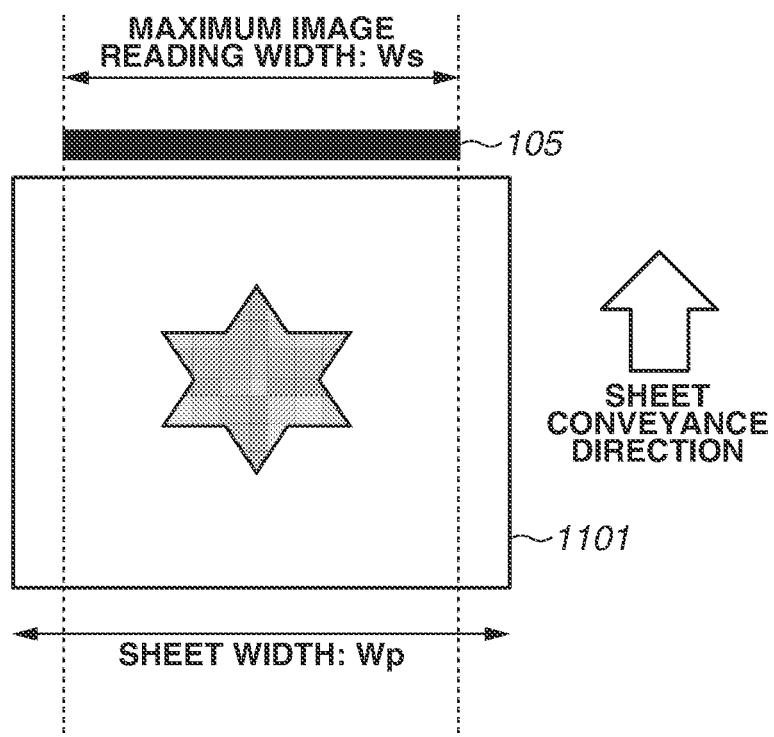
FIG. 11 is a diagram illustrating a relationship between a maximum image reading width and a sheet width.
Figure 12A:
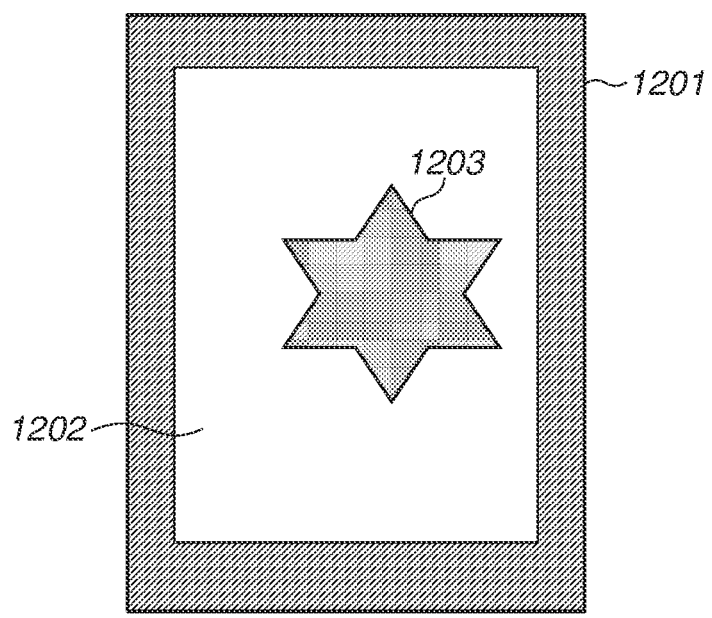
FIGS. 12A and 12B are diagrams illustrating examples of an image subject to inspection and a reference image in a case where a sheet does not exceed a maximum reading width of an image reading device.
Figure 14A:
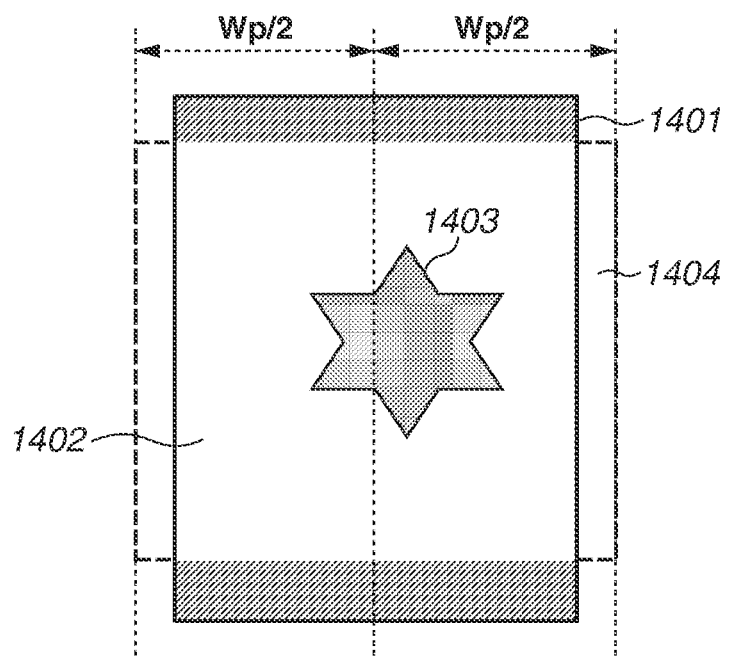
FIGS. 14A and 14B are diagrams illustrating examples of the image subject to inspection and the reference image in a case where a sheet exceeds the maximum reading width of the image reading device.

In step S304, the inspection image acquisition unit 201 uses the image reading device 105 to read the printed material printed by the printing apparatus 190 to acquire image data subject to inspection. The acquired image data subject to inspection is stored in the RAM 102 or the main storage device 104. FIG. 12A illustrates an example of an image subject to inspection in a case where a sheet does not exceed the maximum reading width of the image reading device 105. The image subject to inspection is acquired when the image reading device 105 reads a printed material obtained by printing print data 1203 on a sheet 1202. In this example, a backing area 1201 exists at the left, right, top and bottom of an area indicating the sheet 1202 in the image subject to inspection. The backing area 1201 is an area generated when there is no reading target with respect to a sensor unit of the image reading device 105 during reading. On the other hand, as illustrated in FIG. 11, when a width $W_p$ of a sheet 1101 exceeds a maximum reading width $W_s$ of the image reading device 105, the image subject to inspection is an image as illustrated in FIG. 14A. That is, the image subject to inspection is an image having a missing part of the sheet exceeding the maximum reading width $W_s$ of the image reading device 105. In this example, similarly to FIG. 12A, an image read from a printed material obtained by printing print data 1403 on a sheet 1402 is illustrated, and a backing area 1401 exists top and bottom of an area indicating the sheet 1402. An exceeding area 1404 indicates an area of a sheet that the image reading device 105 fails to read, and is an area not existing in the actual image subject to inspection.

In step S305, the inspection processing unit 205 compares the reference image data and the image data subject to inspection to inspect whether there is a print defect. In the present exemplary embodiment, the printed material is inspected for the print position deviation as the print defect. Firstly, a feature point used for alignment is extracted from the reference image. For example, in a case where corner information of an image is utilized as the feature point, corner detection is performed by a well-known algorithm such as Harris corner detection, and a plurality of feature points is extracted in the descending order of a feature amount, for example. Alternatively, feature points can be added/adjusted manually. In the present exemplary embodiment, affine transformation is used for the alignment process, and thus, it is necessary to extract three or more feature points. According to the characteristics of the affine transformation, these feature points are to be separated from each other and are not to be arranged in a straight line. A feature point extraction process can be performed in advance when the reference image data is acquired and the feature point can be stored in the RAM 102 or the main storage device 104 to be read and used.

Figure 12B:
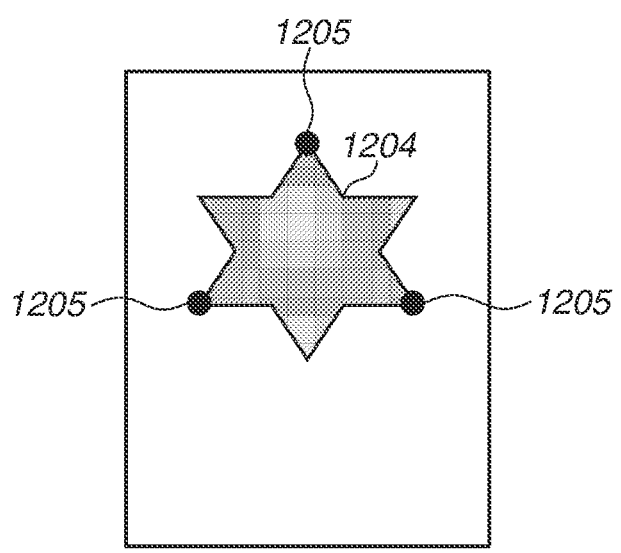
Figure 14B:
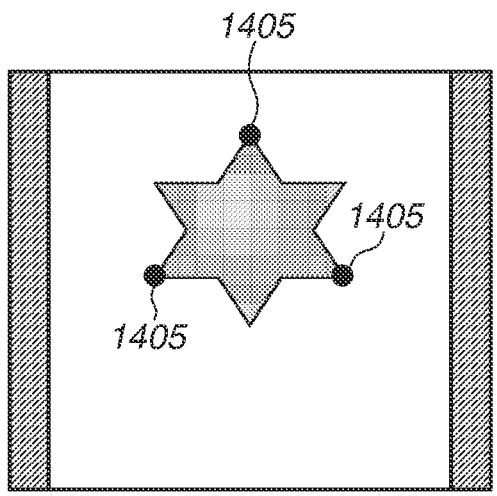

FIG. 12B illustrates an example of feature points 1205 extracted from the reference image in a case where the sheet does not exceed the maximum reading width of the image reading device 105. FIG. 14B illustrates an example of feature points 1405 extracted from the reference image in a case where the sheet exceeds the maximum reading width of the image reading device 105.

The image subject to inspection is searched for correspondence points corresponding to the feature points. A well-known correspondence point search algorithm such as template matching can be utilized for such a search. Then, an affine parameter to be used in the affine transformation is calculated from a relationship between coordinates of the plurality of feature points in the reference image and coordinates of the correspondence points in the image subject to inspection corresponding to the plurality of feature points. Subsequently, the affine parameter is used to align the reference image and the image subject to inspection by the affine transformation.

In a case where the sheet exceeds the maximum reading width of the image reading device 105, the corners of the sheet are not visible in the image subject to inspection, and as a result, estimated values are used for the coordinates of the corners. In the present exemplary embodiment, the coordinates of the invisible corners of the sheet are estimated as follows. Firstly, as illustrated in FIG. 14A, it is assumed that both ends of the sheet in a width direction evenly exceed from the image reading device 105. Next, it is estimated that the corners of the sheet are located at positions separated to the left and right by $W_p/2$ from a central part along an up-down direction of the sheet in the image. Here, $W_p$ is a sheet width. At this time, if the width of the sheet is measured in inches and the coordinates in the image subject to inspection are measured in pixels, that is, if different measurement units are used, a reading resolution (ppi) of the image reading device 105 can be used to convert a physical sheet size into the coordinates in the image subject to inspection.

Figure 13:
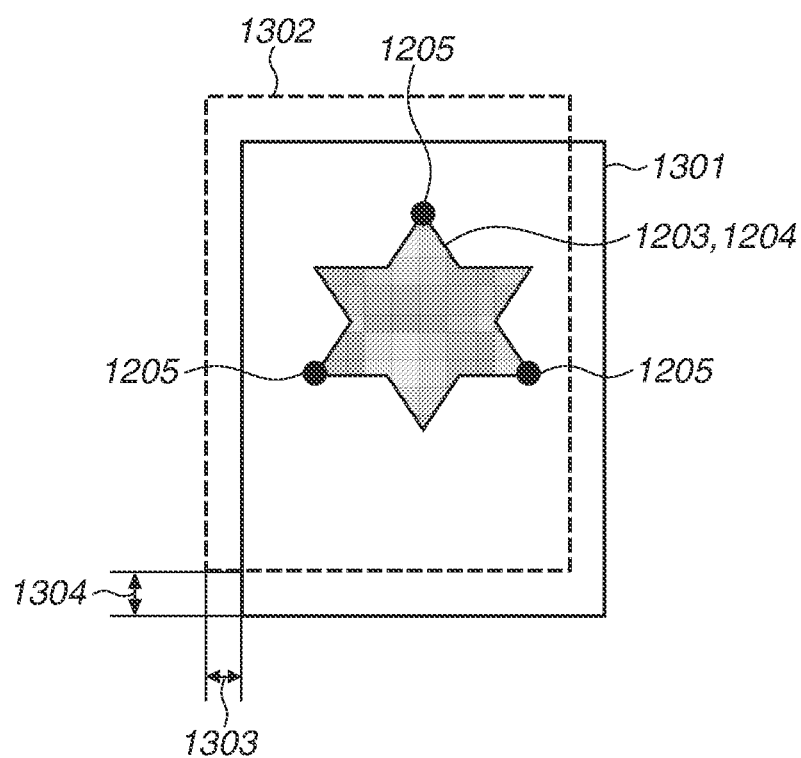
FIG. 13 is a diagram illustrating a state after the reference image and the image subject to inspection are aligned.

FIG. 13 illustrates a state after a reference image 1301 and an image subject to inspection 1302 have been aligned. Positions of print data 1204 in the reference image 1301 and print data 1203 in the image subject to inspection 1302 match, but positions of the sheet corners of the reference image 1301 and the image subject to inspection 1302 are not aligned. A difference in the coordinates of the sheet corners is the print position deviation. In a case where the sheet exceeds the maximum reading width of the image reading device 105, estimated values are used for the sheet corners in the image subject to inspection 1302, and as a result, the aligned coordinates include an error.

In a case where the print position deviation amount is within an error range, it is not possible to correctly evaluate the print position deviation. Accordingly, in step S301, in consideration of the error, it is necessary to control the settable print position deviation inspection parameter.

In the present exemplary embodiment, a horizontal print position deviation 1303 and a vertical print position deviation 1304 are independently calculated as the print position deviation. The calculated horizontal print position deviation 1303 and the vertical print position deviation 1304 are compared with the print position deviation inspection parameter set in step S303, and in a case where a value obtained in the comparison is larger than a set threshold value, it is determined that a print defect occurs, and an inspection result is stored in the RAM 102 or the main storage device 104.

In step S306, the result output unit 206 reads the inspection result from the RAM 102 or the main storage device 104, and displays the inspection result on the UI panel 108. According to the inspection result, the switching is performed so that the printed material is fed either to the output tray 111 for inspection-passed or to the output tray 112 for inspection-failed.

In step S307, it is determined whether the inspection is to be terminated. In a case where the inspection of all pieces of print data is completed, or in a case where the user gives an instruction to end the inspection, the inspection process is terminated, and otherwise, the processing returns to step S304 to continue the process.

<Inspection Parameter Setting Range Control Process>

An inspection parameter setting range control process of step S301 will be described in detail.

FIG. 4 is a flowchart illustrating a flow of the inspection parameter setting range control process according to the present exemplary embodiment. Each step of the flowchart will be described below.

In step S401, the maximum reading width acquisition unit 2031 acquires a maximum reading width $W_s$ of the image reading device 105. For example, in a case where the image reading device 105 is a line scanner, the maximum reading width acquisition unit 2031 acquires an effective sensor width of the line scanner as the maximum reading width $W_s$.

In step S402, the sheet size acquisition unit 2032 acquires a sheet width as the sheet size of the print sheet. For example, a sheet size instructed by the user via the UI panel 108, a sheet size set as a default value, or a sheet size set when printing are used as the sheet size of the print sheet. In the present exemplary embodiment, the sheet width is a length of a sheet side perpendicular to a sheet conveyance direction. FIG. 11 illustrates a relationship among the maximum reading width $W_s$, the sheet width $W_p$, and the sheet conveyance direction.

In step S403, the size determination unit 2034 compares the sheet width $W_p$ acquired in step S402 as the sheet size and the maximum reading width $W_s$ acquired in step S401. In a case where the sheet width $W_p$ is larger than the maximum reading width $W_s$ (YES in step S403), the processing proceeds to step S404, and otherwise (NO in step S403), the processing ends.

In step S404, the minimum detectable position deviation amount determination unit 2033 calculates a minimum detectable position deviation amount. Specifically, a minimum inspectable position deviation amount $D_{min}$ is obtained from Equation (1) based on the maximum reading width $W_s$ and the sheet width $W_p$.

$$D_{min} = \frac{W_p - W_s}{2} \qquad \text{Equation (1)}$$

Figure 5A:
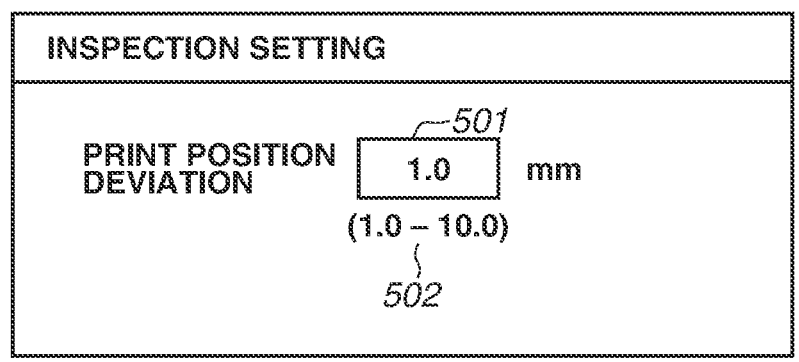
FIGS. 5A and 5B are diagrams illustrating examples of an inspection setting screen according to the first exemplary embodiment.
Figure 5B:
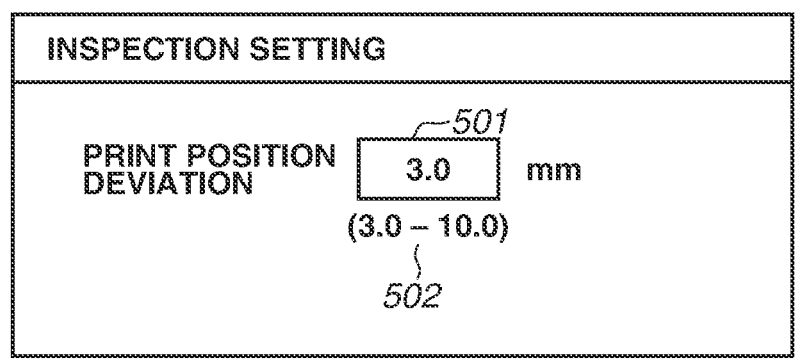

In step S405, the inspection parameter setting range change unit 2035 changes a range of the inspection parameter settable by the user based on the minimum inspectable position deviation amount $D_{min}$, calculated in step S404. FIGS. 5A and 5B illustrate examples of the inspection setting screen in the UI panel 108. FIG. 5A illustrates a default inspection setting screen. In a case where the sheet width does not exceed the maximum reading width, the user performs setting so that an inspection threshold value of the print position deviation is input into the edit box 501 within an inspection parameter setting range 502 illustrated in FIG. 5A, that is, within a range from "1.0 mm to 10.0 mm". On the other hand, FIG. 5B illustrates a state of the inspection setting screen in the UI panel 108 after the change of the settable inspection parameter range 502 has been executed in step S405.

Here, a case where the minimum inspectable position deviation amount calculated in step S404 is $D_{min}$=3.0 is illustrated as an example. In FIG. 5A, the inspection parameter setting range 502 is from "1.0 mm to 10.0 mm", whereas, in FIG. 5B, the inspection parameter setting range 502 is changed to a smaller, more restricted range from "3.0 mm to 10.0 mm". Thus, a settable minimum value of the inspection parameter is changed to $D_{min}$ or more.

In a case where the sheet size exceeds the maximum reading width of the image reading device 105, a settable setting range of the inspection parameter in the print position deviation inspection is changed to be narrower according to the minimum inspectable position deviation amount, by the series of processes described above. As a result, it is possible to appropriately inspect the printed material for the print position deviation even if the sheet exceeds from the maximum reading width.

In the present exemplary embodiment, as an example of the UI panel used for setting the print position deviation inspection threshold value, the edit box is employed for an input operation; however, the UI panel is not limited thereto. For example, as illustrated in FIGS. 6A and 6B, the print position deviation inspection threshold value can be set by selecting a desired numerical value from a pull-down menu. FIG. 6A illustrates a default inspection setting screen. In a case where the sheet width does not exceed the maximum reading width, the print position deviation inspection threshold value is set by selecting one parameter from the pull-down menu 601 illustrated in FIG. 6A, that is, from five types of parameters including 1.0, 2.0, 3.0, 4.0, and 5.0. FIG. 6B illustrates a state of the inspection setting screen in a UI panel after the change of the settable inspection parameter range has been executed in step S405. Here, a case where the minimum inspectable position deviation amount calculated in step S404 is $D_{min}$=3.0 is illustrated as an example. In FIG. 6A, the above-described five types of parameters are illustrated as candidate parameters to be selected, whereas, in FIG. 6B, the number of the candidate parameters to be selected is similarly five, but numerical values are different from those in FIG. 6A. The candidate parameters to be selected are changed so that a selectable minimum value of the parameter is $D_{min}$ or more.

As another example, FIG. 7 illustrates a UI panel for setting a print position deviation inspection threshold value by selecting a desired inspection level from the pull-down menu 701. The print position deviation threshold values are previously associated with the inspection levels, and examples of the association are illustrated in FIGS. 8A and 8B. FIG. 8A is a correspondence table between the inspection levels and the print position deviation threshold values, which is to be used when the sheet width does not exceed the maximum reading width. On the other hand, FIG. 8B illustrates a correspondence table between the inspection levels and the print position deviation threshold values after the change of the settable inspection parameter range has been executed in step S405. The correspondence table between the respective levels and the print position deviation threshold values is changed so that the print position deviation threshold value corresponding to the smallest level is $D_{min}$ or more.

In the first exemplary embodiment, an example is described where the inspection parameter setting range is controlled by limiting an inspection parameter input range and a size of the selectable print position deviation to become smaller.

In a second exemplary embodiment, an example of a change so that the number of selectable inspection levels is limited to a smaller number according to the minimum inspectable position deviation amount will be described.

In the present exemplary embodiment, in a flow of the inspection process performed by the image processing apparatus 100 described with reference to FIG. 3 in the first exemplary embodiment, only the inspection parameter setting range control process illustrated in step S301 is different from the first exemplary embodiment, and thus, this process will be described in detail. Other processes are the same as those in the first exemplary embodiment, and thus, the description thereof will be omitted.

<Inspection Parameter Setting Range Control Process>

FIG. 9 is a flowchart illustrating a flow of an inspection parameter setting range control process according to the present exemplary embodiment.

Respective steps except step S901 in FIG. 9 are the same as those in FIG. 4, so that the description thereof will be omitted. In step S901, the inspection parameter setting range change unit 2035 changes an inspection level range settable by the user based on the minimum inspectable position deviation amount $D_{min}$ calculated in step S404. FIGS. 10A to 10C illustrate examples of an inspection setting screen in a UI panel according to the present exemplary embodiment. In this example, the print position deviation inspection threshold value is set by selecting a desired inspection level from a pull-down menu. FIG. 10A illustrates a default inspection setting screen. In a case where the sheet width does not exceed the maximum reading width, the print position deviation inspection threshold value is set by selecting one parameter from a pull-down menu 1001 illustrated in FIG. 10A, that is, from five types of parameters from a level 1 to a level 5. It is assumed that the print position deviation inspection threshold values corresponding to the respective levels are previously associated with the levels and stored, as illustrated in FIG. 10C. For example, in a case where the user selects the level 1, as the print position deviation inspection threshold value in the image processing apparatus 100, 1.0 mm is set. FIG. 10B illustrates a state of the inspection setting screen in the UI panel after the change of the settable inspection level range has been executed in the present step. Here, a case where the minimum inspectable position deviation amount calculated in step S404 is $D_{min}$=3.0 is illustrated as an example.

In FIG. 10A, the above-described five types of levels are illustrated as the candidate inspection level to be selected, whereas, in FIG. 10B, the candidate parameters to be selected are limited to three types of levels from the level 3 to the level 5. A minimum level where the print position deviation threshold value is $D_{min}$ or more is acquired from the correspondence table illustrated in FIG. 10C, and a content of a pull-down menu 1002 is changed so that such a minimum level set to a minimum level selectable in the pull-down menu 1002. In this example, $D_{min}$ is 3.0, and thus, the level 3 is acquired from the correspondence table, and the minimum level selectable in the pull-down menu 1002 is changed to the level 3.

In a case where the sheet size exceeds the maximum reading width of the image reading device 105, the change is performed so that the number of selectable inspection levels is decreased according to the minimum inspectable position deviation amount, by the process described above. As a result, it is possible to appropriately inspect the printed material for the print position deviation.

In a third exemplary embodiment, a process will be described where the minimum detectable position deviation amount is further determined in consideration of a position deviation during conveyance, and, based on the determined minimum detectable position deviation amount, the inspection parameter setting range is controlled.

Figure 15:
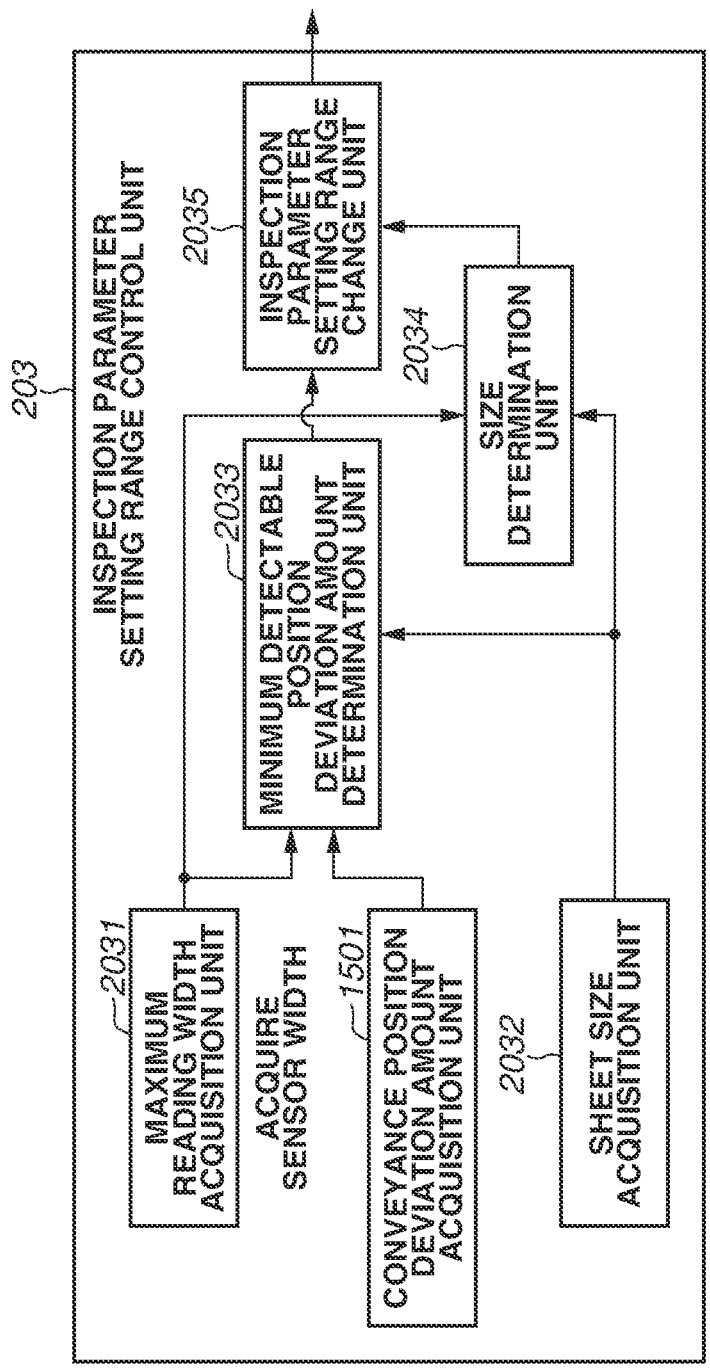
FIG. 15 is a block diagram illustrating a detailed configuration of an inspection parameter setting range control unit according to a third exemplary embodiment.

FIG. 15 illustrates a configuration of each processing block of the image processing apparatus 100 according to an inspection process in the present exemplary embodiment. A conveyance position deviation amount acquisition unit 1501 is added to the configuration described in FIG. 2 of the first exemplary embodiment. A sheet having print data printed thereon is fed to the image reading device 105 via a conveyance path including a guide roller or the like. At that time, a conveyance position deviation may occur due to a mechanical error or the like during sheet feeding. A maximum value of such a conveyance position deviation amount can be calculated in advance by estimating the above-described mechanical error or the like, and stored in the main storage device 104 or the like. The conveyance position deviation amount acquisition unit 1501 acquires a known maximum conveyance position deviation amount by reading such a deviation amount from the main storage device 104 to the RAM 102. Other processing blocks are common with those in FIG. 2, and thus, the description thereof will be omitted.

In the present exemplary embodiment, in the flow of the inspection process performed by the image processing apparatus 100 described with reference to FIG. 3 in the first exemplary embodiment, only the inspection parameter setting range control process illustrated in step S301 is different from the first exemplary embodiment, and thus, such a process will be described in detail. Other processes are the same as those in the first exemplary embodiment, and thus, the description thereof will be omitted.

<Inspection Parameter Setting Range Control Process>

Figure 16:
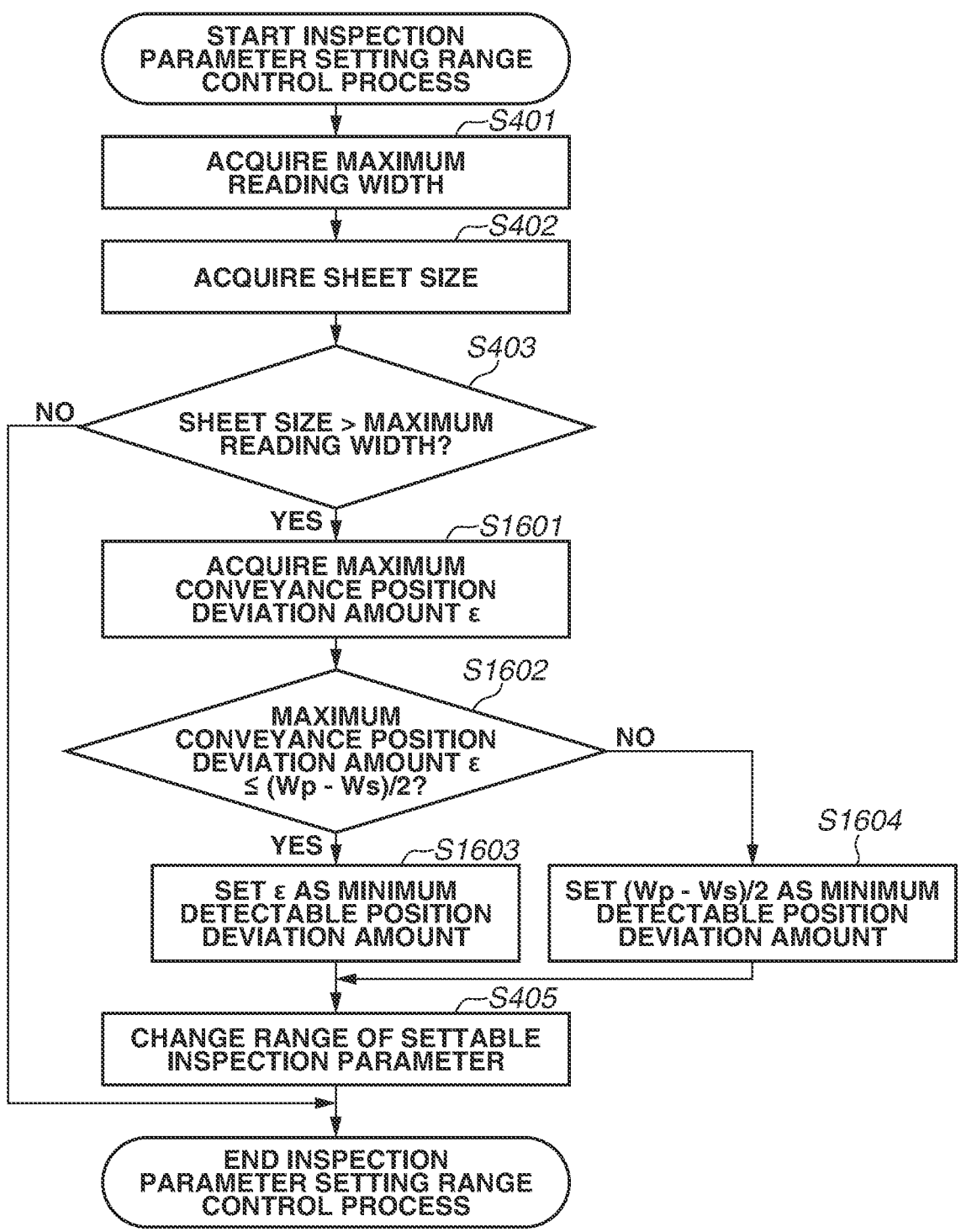
FIG. 16 is a flowchart of an inspection parameter setting range control process according to the third exemplary embodiment.

FIG. 16 is a flowchart illustrating a flow of an inspection parameter setting range control process according to the present exemplary embodiment.

Figure 17:
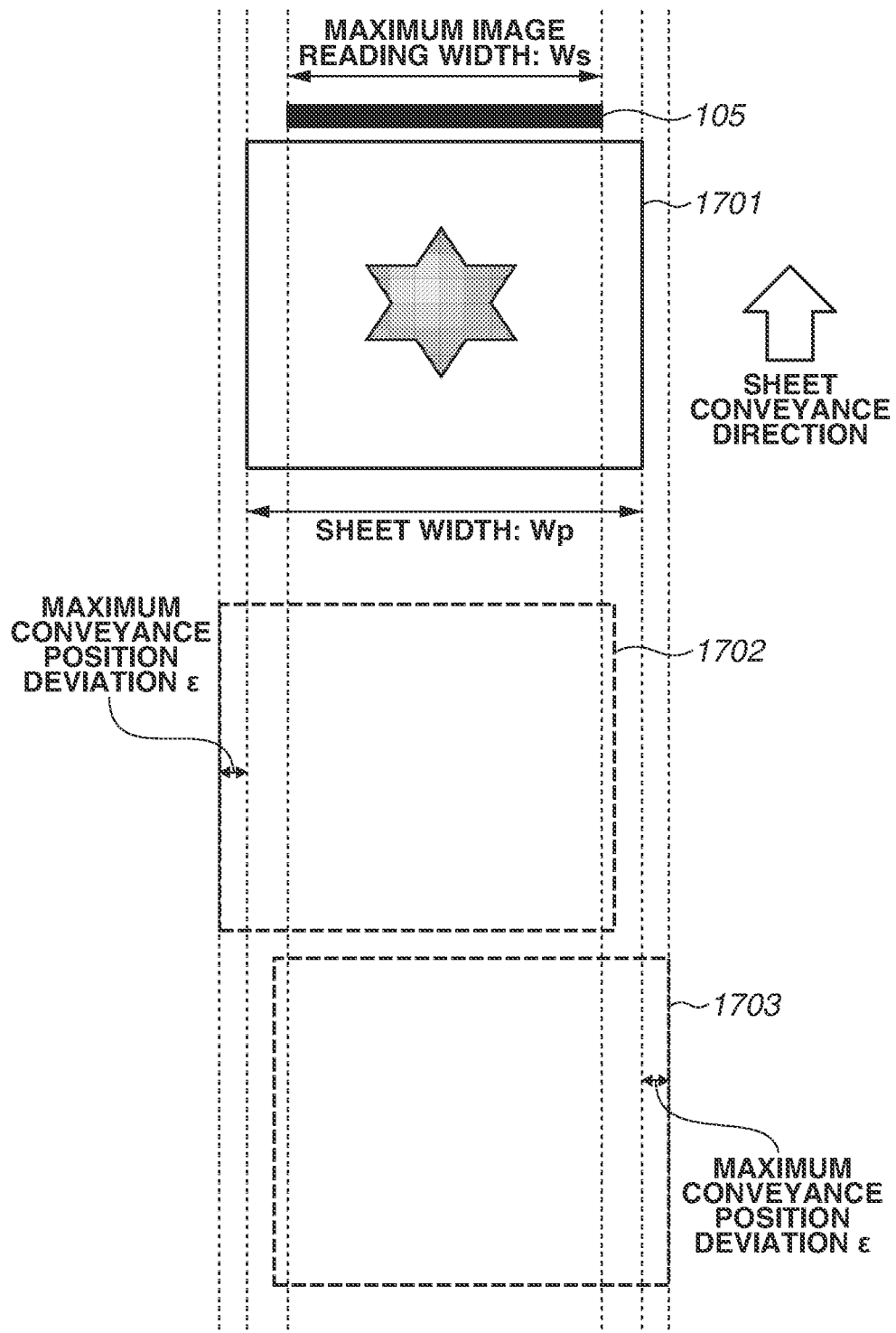
FIG. 17 is a diagram for describing a maximum conveyance position deviation amount.

Respective steps except steps S1601, S1602, S1603 and S1604 in FIG. 16 are the same as those in FIG. 4, so that the description thereof will be omitted. In step S1601, the conveyance position deviation amount acquisition unit 1501 acquires a known maximum conveyance position deviation amount ε by reading such a deviation amount ε from the main storage device 104 to the RAM 102. FIG. 17 is a diagram for describing the maximum conveyance position deviation amount ε. In FIG. 17, a case is illustrated where a sheet 1701 passes through the center of the image reading device 105 without generation of a conveyance position deviation. Reference numeral 1702 indicates a sheet when a maximum conveyance position deviation occurs in a left direction. Reference numeral 1703 indicates a sheet when a maximum conveyance position deviation occurs in a right direction. As illustrated in FIG. 17, a difference between the sheet 1701 and the sheet 1702, or between the sheet 1701 and the sheet 1703 in the width direction of the sheet is the maximum conveyance position deviation amount ε.

In step S1602, the conveyance position deviation amount acquisition unit 1501 determines whether the maximum conveyance position deviation amount ε is $(W_p-W_s)/2$ or less. Here, $W_s$ is the maximum reading width and $W_p$ is the sheet width. In a case where such a condition is satisfied (YES in step S1602), the processing proceeds to step S1603, and otherwise (NO in step S1602, the processing proceeds to step S1604.

In step S1603, the minimum detectable position deviation amount determination unit 2033 sets the minimum detectable position deviation amount to $D_{min}=\varepsilon$.

In step S1604, the minimum detectable position deviation amount determination unit 2033 sets the minimum detectable position deviation amount to $D_{min}=(W_p-W_s)/2$.

According to the processing described above, when the minimum detectable position deviation amount is determined in consideration of the position deviation during conveyance and, based on such a deviation amount, an inspection parameter settable range is controlled, it is possible to appropriately inspect a sheet, even if the sheet size exceeds the maximum reading width.

In the present exemplary embodiment, similarly to the first exemplary embodiment, an example of controlling the inspection parameter settable range is described, but the following procedures can also be used. That is, based on the minimum detectable position deviation amount determined in consideration of the position deviation during conveyance, a process of limiting the number of selectable inspection levels as indicated in the second exemplary embodiment is performed. Thus, it is possible to obtain the similar effect.

In the first exemplary embodiment to the third exemplary embodiment, the UI panel used to set one parameter is described as an example of the UI panel used to set the print position deviation inspection parameter. However, as illustrated in FIG. 18, for example, a UI panel that independently sets parameters corresponding to the respective vertical and horizontal print position deviations can be used to control the inspection parameter setting range independently vertically and horizontally.

Figure 19:
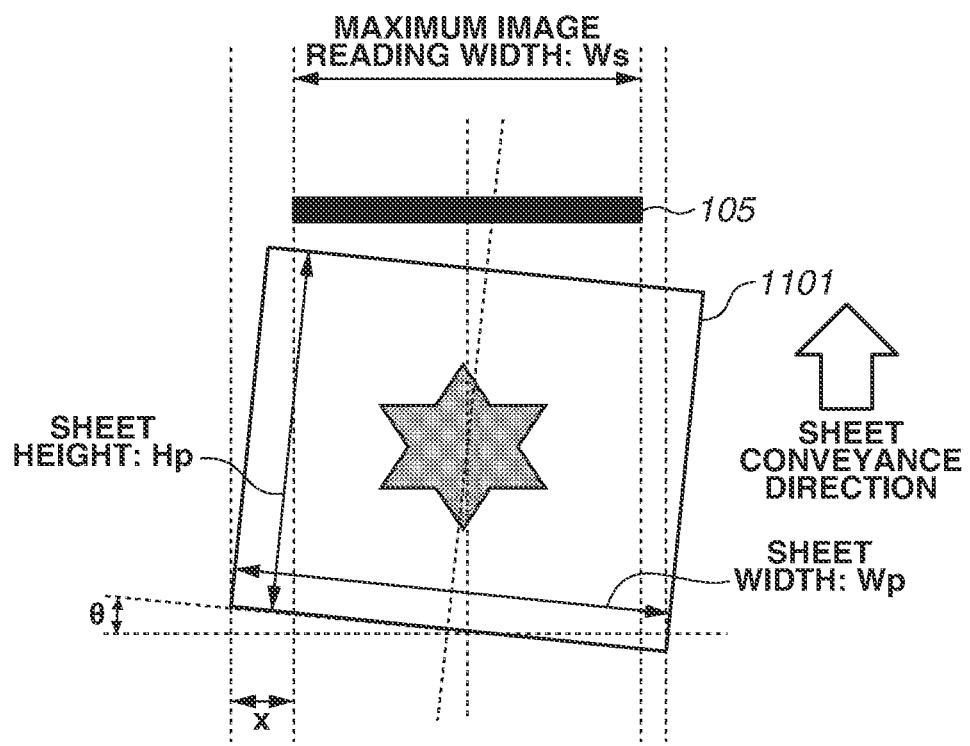
FIG. 19 is a diagram for describing skew of a sheet.

Further, skew of the sheet can be considered when calculating the minimum detectable position deviation amount. FIG. 19 illustrates a relationship between the image reading device 105 and the sheet when the sheet is skewed. Here, a maximum skew angle of the sheet is θ. In this case, if the minimum detectable position deviation amount is set to $D_{min}=x$, and the <Inspection Parameter Setting Range Control Process> described in the first to third exemplary embodiments is performed, it is possible to obtain the similar effect. "x" can be calculated by Equation (2).

$$x = \left(\frac{W_p}{2} + \frac{H_p}{2}\tan\theta\right)\cos\theta - \frac{W_s}{2} \qquad \text{Equation (2)}$$

Here, $W_p$ is the sheet width, $H_p$ is the height of the sheet, and $W_s$ is the maximum reading width of the image reading device 105.

According to the above-described disclosure, it is possible to appropriately inspect a printed material for a print position deviation, even in a case where a width of a print medium is larger than a readable width for reading the print medium.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-207881, filed Dec. 15, 2020, which is hereby incorporated by reference herein in its entirety.

What is claimed is:

1. An image processing apparatus, comprising:
   a setting unit configured to set a condition for detecting a print position deviation on a print medium in a printed material; and
   an inspection unit configured to inspect, based on the condition, data obtained by reading the print medium for the print position deviation,
   wherein, in the condition, in a case where a width of the print medium is larger than a readable width for reading the print medium, a settable range is small relative to a case where the width of the print medium is smaller than the readable width.

2. The image processing apparatus according to claim 1, further comprising an image reading unit,
   wherein the inspection unit compares a reference image and an image subject to inspection obtained by reading the printed material by the image reading unit to perform the inspection.

3. The image processing apparatus according to claim 1, wherein in a case where the width of the print medium is larger than the readable width for reading the print medium, the setting unit sets the settable range by changing a previously determined range.

4. The image processing apparatus according to claim 1, wherein the settable range is expressed by a level of the print position deviation.

5. The image processing apparatus according to claim 4, wherein in a case where the width of the print medium is larger than the readable width for reading the print medium, the setting unit sets the settable range so that a print position deviation corresponding to the level increases in size relative to a case where the width of the print medium is smaller than the readable width.

6. The image processing apparatus according to claim 1, wherein the setting unit sets the settable range so that a magnitude of a print position deviation set to an inspection level allowing for detection of a minimum position deviation is a minimum detectable position deviation amount.

7. The image processing apparatus according to claim 1, wherein the setting unit sets the condition independently vertically and horizontally relative to the print medium.

8. The image processing apparatus according to claim 1, further comprising a conveyance position deviation amount acquisition unit configured to acquire a conveyance position deviation amount of the print medium,
   wherein the setting unit sets the condition, based on the readable width for reading the print medium, the width of the print medium, and the conveyance position deviation amount.

9. A non-transitory computer-readable storage medium storing one or more programs including instructions, which when executed by a computer, cause the computer to perform operations comprising:
   setting a condition for detecting a print position deviation on a print medium in a printed material; and
   inspecting, based on the condition, data obtained by reading the print medium for the print position deviation,
   wherein, in the condition, in a case where a width of the print medium is larger than a readable width for reading the print medium, a settable range is small relative to a case where the width of the print medium is smaller than the readable width.

10. An image processing method, comprising:
    setting a condition for detecting a print position deviation on a print medium in a printed material; and
    inspecting, based on the condition, data obtained by reading the print medium for the print position deviation,
    wherein, in the condition, in a case where a width of the print medium is larger than a readable width for reading the print medium, a settable range is small relative to a case where the width of the print medium is smaller than the readable width.

* * * * *